United States Patent Office 2,877,268
Patented Mar. 10, 1959

2,877,268
SUBSTITUTED UREAS

Fred Applegath and Raymond A. Franz, El Dorado, Ark., assignors to Monsanto Chemical Company, St. Louis, Mo., a corporation of Delaware No Drawing. Application December 24, 1956
Serial No. 630,070

8 Claims. (Cl. 260—553)

This invention relates to substituted ureas. More specifically, it pertains to an improved process for the preparation of 1,3-diarylureas.

The reaction of carbonyl sulfide (COS) and alkylamines to produce 1,3-dialkylureas in excellent yields is well-known in the art. According to methods heretofore employed, the reaction of arylamines and COS to produce 1,3-diarylamines has been found most unsatisfactory requiring exceptionally long reaction periods to produce even small yields of the desired urea.

It is an object of this invention to provide an improved process for the preparation of 1,3-diarylureas. It is a further object to provide an improved process for the preparation of 1,3-diarylureas by the reaction of COS and arylamines. Other objects will become apparent from the description of the invention.

It has now been discovered that 1,3-diarylureas can be conveniently prepared in excellent yields by reacting a mono-primary-arylamine and COS in the presence of an alkaline catalyst having a dissociation constant greater than $1 \times 10^{-10}$. The following examples illustrate this invention.

Example I

The reaction was carried out in a stainless steel autoclave. Aniline in the amount of 18.8 g. (0.2 mole) and 28 g. (0.47 mole) of carbonyl sulfide was charged to the reactor. A pressure of 80 p. s. i. g. in the reaction resulted. The closed reactor was heated to 120° C. for 4 hours after which time the contents were cooled and removed from the reactor by rinsing with hot methanol. The methanol slurry of the reaction products was partially evaporated and dilute hydrochloric acid added to precipitate the product. The product, 1,3-diphenylurea (carbanilide), was filtered therefrom and dried. The carbanilide thus obtained had a melting point of 235° C. and represented a yield of 11% on aniline charged.

Example II

The procedure set forth in Example I was repeated with the exception that 2.0 g. (0.02 mole) of triethylamine was added to the reaction mixture. In this case 15.0 g. of carbanilide was obtained representing a 71% yield based on aniline charged. A comparison of Examples I and II illustrates the advantages of the novel process of this invention.

Example III

The procedure set forth in Example I is repeated using 214 g. of o-toluidine, 94 g. of COS and 30 ml. of triethylamine. A 45.4% yield of 1,3-bis(2-methylphenyl)-urea, M. P. 263° C., is obtained.

Example IV

The procedure set forth in Example I is repeated using 286 g. of β-naphthylamine, 78 g. of COS and 30 ml. of triethylamine. A 36% yield of 1,3-di-β-naphthylurea is obtained.

Example V

The procedure set forth in Example I is repeated using 18.8 g. of aniline, 28 g. of COS and 6 g. of sodium oleate. An excellent yield of carbanilide is obtained.

Example VI

The procedure set forth in Example I is repeated using 18.8 g. of aniline, 28 g. of COS and 3.0 g. of triethanolamine. An excellent yield of carbanilide is obtained.

Example VII

The procedure set forth in Example I is repeated using 18.8 g. of aniline, 28 g. of COS and 1.0 g. of KOH. An excellent yield of carbanilide is obtained.

Example VIII

The procedure set forth in Example I is repeated using 25.5 g. of 4-chloroaniline, 28 g. of COS and 2.0 g. of triethylamine. A good yield of 1,3-bis(4-chlorophenyl)-urea is obtained. Comparable results are obtained using 2-chloroaniline and 3-chloronaniline as the starting material.

Example IX

The procedure set forth in Example I is repeated using 24.6 g. of 4-methoxyaniline, 28 g. of COS and 2.0 g. of triethylamine. A good yield of 1,3-bis(4-methoxyphenyl)-urea is obtained.

Example X

The procedure set forth in Example I is repeated using 21.8 g. of 4-aminophenol, 28 g. of COS and 2.0 g. of triethylamine. A good yield of 1,3-bis(4-hydroxyphenyl)urea is obtained.

In addition to the ureas set forth in the preceding specific examples, the following are additional ureas that can be prepared by the novel process of this invention using the indicated aromatic amine:

| Aromatic Amine | Substituted Ureas |
| --- | --- |
| ethyl-p-amino-benzoate | 1, 3 - bis (4 - carbethoxyphenyl) - urea. |
| p-aminobenzoic acid | 1,3 - bis(4 - carboxyphenyl) urea. |
| p-aminobenzonitrile | 1,3 - bis(4 - cyanophenyl) urea. |
| p-anisidine | 1,3 - bis(4 - methyoxyphenyl) urea. |
| p-toluidine | 1,3 - bis(4 - methylphenyl) urea. |
| 2,4-dimethylaniline | 1,3 - bis(2,4 - dimethylphenyl)-urea. |
| 2,5-dimethylaniline | 1,3 - bis(2,5 - dimethylphenyl)-urea. |
| 2,6-dimethylaniline | 1,3 - bis(2,6 - dimethylphenyl)-urea. |
| 5-chloro-2-methylaniline | 1,3 - bis(5 - chloro-2-methyl-phenyl) urea. |
| 5-chloro-2-methoxyaniline | 1,3 - bis(5-chloro-2-methoxyphenyl) urea. |
| N,N-diethyl - p - phenylene-diamine. | 1,3 - bis(4 - diethylaminophenyl)-urea. |
| N,N - dimethyl - p - phenylene-diamine. | 1,3 - bis(4 - dimethylaminophenyl) urea. |

The procedure set forth in the preceding examples is subject to substantial variation without departing from the scope of this invention. Any mono-primary-arylamine can be used in the reaction. By "mono-primary-arylamine" is meant an arylamine containing only one —NH$_2$ group attached directly to an aromatic carbon atom. The aryl radical, of which phenyl and naphthyl are preferred, can contain no substituent groups other than the mentioned —NH$_2$ group or it may contain one or more other substituents which are inert under the conditions of the reaction, i. e., do not prevent the formation of any of the desired 1,3-diarylureas. Typical of substituent groups that can be present on the aryl radical are halogens, including chlorine, bromine, fluorine and iodine, alkyl, alkoxy, aralkyl, dialkylamino, hydroxy, thiol, nitro, cyano, cyanoalkyl, cyanoalkoxy, etc. In the case of any of the alkyl substituents, alkyl groups containing from 1 to 18 carbon atoms are preferred. The mono-primary-arylamines can be monosubstituted or polysubstituted with one or more of the above mentioned groups. The higher the degree of substitution the lower the yield of the desired urea. Ortho substituted arylamines are the least desirable in this reaction since they lower the yield of the desired urea because of steric hindrance. Furthermore, in the case of 2-hydroxy and 2-thiol substituted arylamines a competing reaction takes place resulting in the formation of oxazoles and thiazoles in addition to the formation of the desired urea. Thus, in the reaction of this invention, 2-hydroxyaniline will form some 2-benzoxazolol in addition to 1,3-bis(2-hydroxyphenyl)urea. Similarly, in this reaction, 2-aminothiophenol will form some 2-benzothiazolol in addition to 1,3-bis(2-mercaptophenyl)urea.

The reaction temperature may also be substantially varied. Elevated temperatures are used. A temperature of at least 60° C. is preferred and temperatures as high as 200° C. can be employed. Temperatures in the range of from about 70° C. to about 150° C. are particularly preferred.

While the reaction will take place at atmospheric pressure, elevated pressures are preferred. A reaction pressure varying from about 25 p. s. i. a. (pounds per square inch absolute) to about 250 p. s. i. a. are particularly advantageous. Reaction presures as high as 500 p. s. i. a. or even higher can be used if desired but offer no particular advantage.

The proportions of reactants used in this process are also subject to substantial variation. While approximately two molecular proportions of carbonyl sulfide for each molecular proportion of the mono-primary-amine is preferred, the mole ratio of carbonyl sulfide to the aromatic amine can be varied from about 0.5:1 to about 4:1.

If desired the process can be carried out in the presence of an inert solvent or diluent. For this purpose alkyl alcohols containing from 1 to 8 carbon atoms are preferred. Other diluents which can be employed in this reaction are hydrocarbons, halogenated hydrocarbons, mineral oils, ethers, amines, glycols and acid amides. Water per se is not a preferred diluent although it can be present in minor amounts in the organic diluent. The following are examples of materials that can be employed as diluents: ligroin, isopropanol, isopropyl ether, ethanol, trichloro-ethylene, pyridine, isopropanol-water, ethylene glycol, methyl Cellosolve, tetrahydrofurfuryl alcohol, N,N-dimethylaniline, N,N-diethyl-ethanolamine, formamide, amyl alcohol, and benzene.

Any alkaline material having a dissociation constant greater than about $1 \times 10^{-10}$ can be used as the alkaline catalyst in this reaction. For this purpose tertiary alkyl amines containing from 1 to 18 carbon atoms are particularly preferred. Other catalysts that can be used are quaternary ammonium hydroxides, alkaline earth metal hydroxides, the alkali metal hydroxides, of which sodium hydroxide and potassium hydroxide are particular examples, alkaline alkali metal salts, such as sodium oleate, N,N-dimethylbenzylamine, N,N-diethyl-p-toluidine, tri-n-hexylamine, triethanolamine, N,N-diethyloctadecylamine, a mixture of magnesium oxide and methanol, and a mixture of calcium and methanol. The quantity of alkaline material used for the catalyst can also be varied substantially. Minor amounts are preferred. From about 0.002 to about 0.2 mole of the alkaline catalyst per mole of the aromatic amine have been found to be particularly useful.

After the reaction is complete the substituted ureas can be recovered from the reaction mixture by any method well-known to those skilled in the art.

What is claimed is:

1. In the process for the preparation of substituted ureas by reacting by mixing carbonyl sulfide and a mono-primary-arylamine at a mole ratio of carbonyl sulfide to said amine in the range of from about 0.5:1 to about 4:1 at an elevated temperature, the improvement which comprises carrying out the reaction in the presence of an alkaline catalyst having a dissociation constant greater than about $1 \times 10^{-10}$.

2. The process as described in claim 1 wherein the reaction is carried out at a temperature in the range of from about 70° C. to about 150° C.

3. The process as described in claim 2 wherein the alkaline catalyst is a tertiary amine.

4. A process as described in claim 3 wherein the mono-primary-arlyamine is aniline.

5. The process as described in claim 3 wherein the mono-primary-arylamine is chloroaniline.

6. The process as described in claim 3 wherein the mono-primary-arylamine is toluidine.

7. The process as described in claim 3 wherein the mono-primary-arylamine is a methoxy substituted aniline.

8. The process as described in claim 3 wherein the mono-primary-arylamine is β-naphthylamine.

References Cited in the file of this patent

Lewis et al.: J. Am. Chem. Soc., vol. 37 (1915), page 1977.

Klemenc: Z. Anorg. Aldgem. Chim., vol. 191 (1930), pages 258 and 259.

Uno et al.: C. A., vol. 47, column 386 (1935).

Hagelloch: Berichte Chemische Gesellschaft, vol. 83, pages 258 to 261 (1953).